(12) United States Patent
Matsubara

(10) Patent No.: US 9,606,428 B2
(45) Date of Patent: Mar. 28, 2017

(54) ILLUMINATING OPTICAL DEVICE, PROJECTOR AND METHOD OF CONTROLLING AN ILLUMINATING OPTICAL DEVICE

(75) Inventor: Masateru Matsubara, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 49 days.

(21) Appl. No.: 14/426,724

(22) PCT Filed: Sep. 12, 2012

(86) PCT No.: PCT/JP2012/073334
§ 371 (c)(1),
(2), (4) Date: Mar. 6, 2015

(87) PCT Pub. No.: WO2014/041636
PCT Pub. Date: Mar. 20, 2014

(65) Prior Publication Data
US 2015/0219984 A1    Aug. 6, 2015

(51) Int. Cl.
*G03B 21/20* (2006.01)
*G03B 33/04* (2006.01)
(Continued)

(52) U.S. Cl.
CPC ......... *G03B 21/204* (2013.01); *G02B 26/008* (2013.01); *G02B 27/141* (2013.01);
(Continued)

(58) Field of Classification Search
CPC  G02B 26/008; G02B 27/141; G03B 21/2013; G03B 21/204; G03B 21/2053;
(Continued)

(56) References Cited

U.S. PATENT DOCUMENTS 8,021,001 B2    9/2011  Iwanaga
8,308,306 B2   11/2012  Miyazaki et al.
(Continued)

FOREIGN PATENT DOCUMENTS

JP    2005-025107 A    1/2005
JP    2005-156881 A    6/2005
(Continued)

OTHER PUBLICATIONS

International Search Report in PCT/JP2012/073334 dated Dec. 11, 2012 with English Translation.

*Primary Examiner* — Sultan Chowdhury
*Assistant Examiner* — Magda Cruz
(74) *Attorney, Agent, or Firm* — McGinn IP Law Group, PLLC

(57) ABSTRACT

Provided is an illuminating optical device that can reduce lowering of luminance in a display mode for enhancing color reproducibility. A multiple number of light source units (11, 19, 20) each emit a different color of light. Color wheel (28) includes multiple transmissive regions that each transmit a different color of light and that moves the point on which the incident light from each light source unit falls, over the transmissive regions as the wheel rotates. A storage (50) stores a multiple number of lighting pattern information items each item providing a lighting pattern to turn on each light source unit in a different period of lighting. A controller (60) receives a select signal for selecting one of the multiple lighting patterns to turn on each light source unit in accordance with the lighting pattern information that provides the lighting pattern selected by the select signal.

12 Claims, 9 Drawing Sheets

(51) Int. Cl.
*G03B 33/12* (2006.01)
*H04N 9/31* (2006.01)
*G02B 26/00* (2006.01)
*G02B 27/14* (2006.01)
*G03B 21/00* (2006.01)

(52) U.S. Cl.
CPC ....... *G03B 21/208* (2013.01); *G03B 21/2013* (2013.01); *G03B 21/2053* (2013.01); *G03B 21/2066* (2013.01); *G03B 33/04* (2013.01); *G03B 33/12* (2013.01); *H04N 9/3111* (2013.01); *H04N 9/3158* (2013.01); *H04N 9/3164* (2013.01); *G03B 21/008* (2013.01)

(58) Field of Classification Search
CPC .. G03B 21/2066; G03B 21/208; G03B 33/04; G03B 33/12; G03B 21/008; H04N 9/3111; H04N 9/3158; H04N 9/3164; H04N 2209/043; H04N 26/008
See application file for complete search history.

(56) References Cited

U.S. PATENT DOCUMENTS

| | | | |
|---|---|---|---|
| 8,465,159 | B2 | 6/2013 | Iwanaga |
| 2010/0238412 | A1* | 9/2010 | Kurosaki ............. G03B 21/204 353/31 |
| 2010/0283977 | A1* | 11/2010 | Wang ................... H04N 9/3114 353/84 |
| 2010/0328627 | A1* | 12/2010 | Miyazaki ............. G02B 26/008 353/85 |
| 2011/0292098 | A1 | 12/2011 | Iwanaga |
| 2013/0021587 | A1 | 1/2013 | Miyazaki et al. |
| 2013/0249963 | A1 | 9/2013 | Iwanaga |

FOREIGN PATENT DOCUMENTS

| | | |
|---|---|---|
| JP | 2005-331705 A | 12/2005 |
| JP | 2007-094108 A | 4/2007 |
| JP | 2011-013316 A | 1/2011 |
| JP | 2011-191602 A | 9/2011 |

\* cited by examiner

ILLUMINATING OPTICAL DEVICE, PROJECTOR AND METHOD OF CONTROLLING AN ILLUMINATING OPTICAL DEVICE

TECHNICAL FIELD

The present invention relates to an illuminating optical device, projector and a control method of an illuminating optical device.

BACKGROUND ART

As a projector for projecting images on a screen there has been a single-chip DLP (Digital Light Processing) projector that includes an illuminating optical device emitting multiple colors of light in a time division fashion and a reflection type image display device such as DMD (Digital Mirror Device) reflecting each color of light from the illuminating optical device toward the screen.

The illuminating optical device of a single-chip DLP projector, in general, includes a white light source and a color wheel that time-divides light from the white light source into multiple colors of light. The color wheel includes a disc having a plurality of transmissive regions each allowing a different color of light that passes therethrough and a motor for turning the disc. As the disc is rotated by the motor, the point on the disc on which the light from the white light source is incident changes, so that the light enters each of the transmission regions in turns. As a result, the color of light passing through the color wheel changes in a time division fashion. Here, the disc is formed with three transmissive regions that each transmit light of red(R), green(G) and blue(B) (which will be referred to hereinbelow as RGB).

The multiple colors of light emitted a in time division fashion from the illuminating optical device are modulated by the reflection type image display device and projected on the screen by way of a projection optical system. Accordingly, different colors of light are projected successively on the screen. In this process, if the rotational rate of the color wheel is so high that humans cannot perceive change of views, the projected image will be perceived as a synthesized color image of the different colors of light.

In the above configuration, as a method for enhancing luminance of the projected image, increasing the number of light sources can enhance the brightness of light that the light source emits. However, increasing the number of light sources results in an increase in power consumption. In contrast to this, as a method of enhancing luminance of the projected image without increasing power consumption, there is a method of enhancing the usage efficiency of light emitted from the light source by raising the ratio of the light that is transmitted through the color wheel to be incident on the DMD, to the light emitted from the light source.

Specifically, as a technology for raising usage efficiency of light, for example there is a means that can decrease the ratio of light blocked by the color wheel to the incident light, by providing additional transmissive regions that permit colors of light (e.g., white (W), yellow (Y), magenta (M), cyan (C) and the like) other than RGB, to pass therethrough.

Further, as another technological example for raising usage efficiency of light, Patent Document 1 discloses a projector which replaces the white light source with light sources that emit colors of light, instead of using additional transmissive regions for colors of light except for RGB. This projector includes a first light emitting diode that emits light containing red and green light; a second light emitting diode that emits blue light, a color wheel and a DMD.

In the projector disclosed in Patent Document 1, when, for example red light enters the DMD, light containing red and green light emitted from the first light emitting diode, is made incident on the red light transmissive region that transmits red light. In this case, only green light is blocked by the color wheel, but red light is permitted to pass. When white light from a white light source enters the red light transmissive region, light components other than green light are also blocked by the red light transmissive region. This is why the usage efficiency of light in the projector disclosed in Patent Document 1 can be raised compared to the case of using a white light source.

When colorful images such as movies etc., are projected, enhancement of color reproducibility is required. However, in order to enhance color reproducibility, it is necessary to limit the maximum brightness of each color light in order to adjust the balance between colors. As a result, luminance tends to be lowered. In this way, enhancement of the brightness of the projector and enhancement of color reproducibility stand in a trade-off relationship, hence it has been impossible to achieve high-luminance display and high-color reproducibility display at the same time.

For this reason, typical projectors have a plurality of display modes for dealing with various scenes in which the projector may be used such as a high-luminance mode for projecting a high-luminance image, a high color reproducibility mode for projecting a high-color reproducibility image. For example, when the projector is used for displaying presentation materials and the like, the high-luminance mode is used, whereas in a case of displaying the movie or the like, the high color reproducibility mode is used.

RELATED ART DOCUMENTS

Patent Documents

Patent Document 1: JP2011-191602A

SUMMARY OF THE INVENTION

Problems to be Solved by the Invention

However, in the high-color reproducibility mode, the maximum brightness of each color light is limited so that the luminance of the projected image markedly lowers, resulting in an image that is difficult for the user to see. In contrast to this, in the technology of providing additional transmissive regions for colors of light other than RGB, and in the technology disclosed in Patent Document 1, it is possible to enhance the luminance. However, in the high color reproducibility mode, the maximum brightness of each color light is limited, with the result that there is a significant lowering of luminance.

The object of the present invention is to provide an illuminating optical device, projector and a control method of an illuminating optical device, which can reduce lowering of luminance in high-color reproducibility mode.

Means for Solving the Problems

An illuminating optical device of the present invention includes: a plurality of light source units each emitting a different color of light; a color wheel that includes a plurality of transmissive regions that each transmit a different color of light and that moves the point on which the incident light from each light source unit falls, over the transmissive regions as the wheel rotates; a storage for storing a plurality of lighting pattern information each indicating a lighting pattern to turn on each light source unit in a different period of lighting; and, a controller that receives a select signal for selecting one pattern from among the multiple lighting patterns to turn on each light source unit in accordance with the lighting pattern information indicating the lighting pattern selected by the select signal.

A projector of the present invention includes: the above illuminating optical device; a reflection type image display device that modulates light output from the illuminating optical device in accordance with a video signal; and, a projection optical system that projects light modulated by the reflection type image display device.

A illumination method of the present invention is an illumination method by an illuminating optical device including: a plurality of light source units each emitting a different color of light; and, a color wheel that includes a plurality of transmissive regions that each transmit a different color of light and that moves the point on which the incident light from each light source unit falls, over the transmissive regions as the wheel rotates, includes the steps of receiving a select signal for selecting one item of information from among a plurality of lighting pattern information items each indicating a lighting pattern to turn on each light source unit in a different period of lighting; and, turning on each light source unit in accordance with the lighting pattern information indicating the lighting pattern selected by the select signal.

Effect of the Invention

According to the present invention, it is possible to reduce lowering of luminance in the display mode in order to enhance color reproducibility.

MODE FOR CARRYING OUT THE INVENTION

Figure 1:
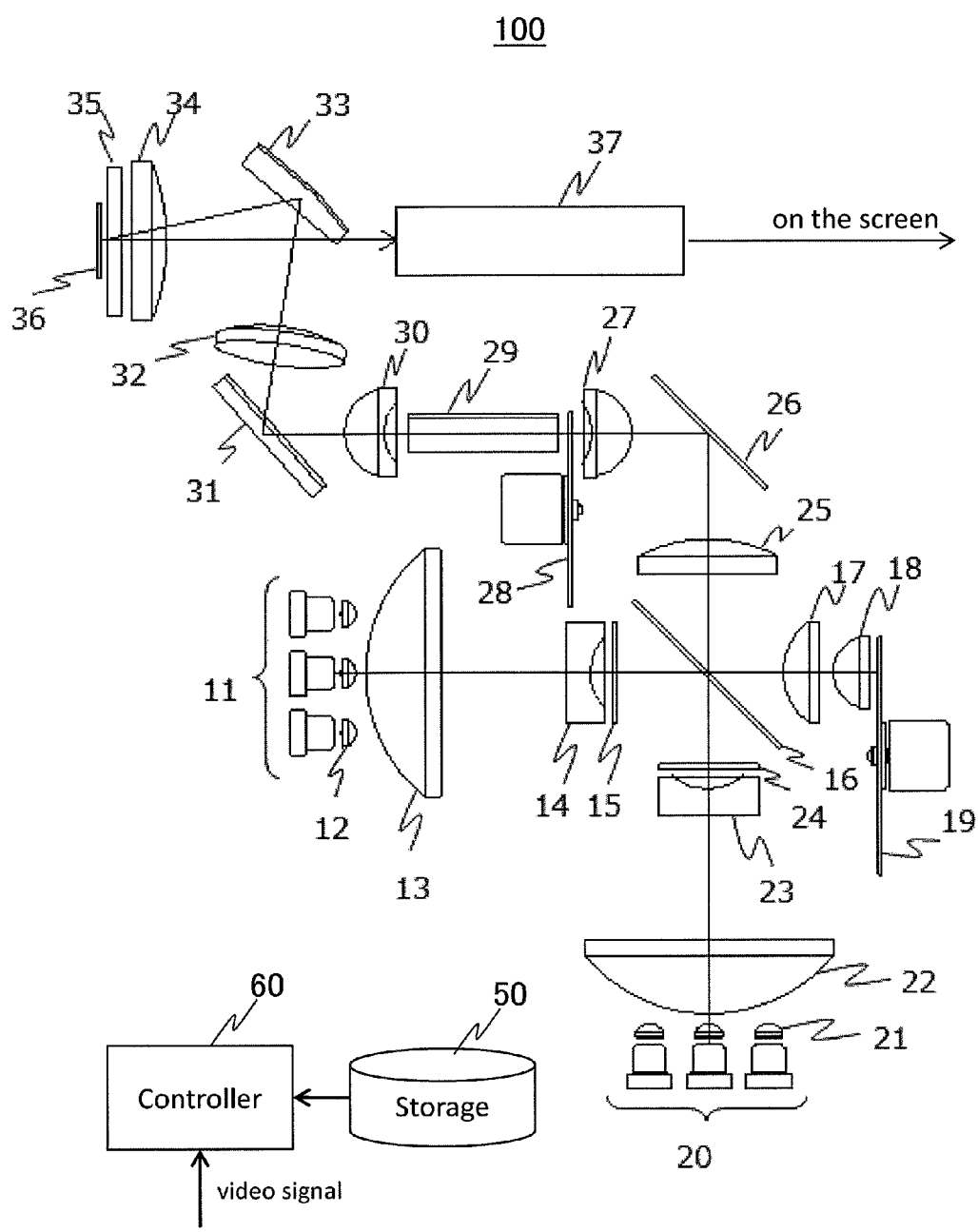
FIG. 1 A diagram showing a configuration of a projector according to one exemplary embodiment of the present invention.

Now, the exemplary embodiment of the present invention will be described with reference to the accompanying drawings. In the description and drawings herein, the components having the same functions are allotted the same reference numerals so that repeated explanation may be omitted.

FIG. 1 is a diagram showing a configuration of a projector according to one exemplary embodiment of the present invention. Projector 100 shown in FIG. 1 is a single-chip DLP projector having a reflection type image display device.

Projector 100 includes first light source 11, first collimator lenses 12, first condenser lens 13, first divergent lens 14, first diffusing plate 15, dichroic mirror 16, second condenser lens 17, third condenser lens 18, phosphor wheel 19, second light source 20, second collimator lenses 21, fourth condenser lens 22, second divergent lens 23, second diffusing plate 24, fifth condenser lens 25, first reflector 26, sixth condenser lens 27, color wheel 28, light tunnel 29, seventh condenser lens 30, second reflector 31, eighth condenser lens 32, third reflector 33, ninth condenser lens 34, cover glass 35, DMD 36, projection optical system 37, storage 50 and controller 60.

First light source 11 is an excitation light source for emitting excitation light. First light source 11 includes a plurality of laser diodes and emits blue light. Here, since first light source 11 is an excitation light source, it is not limited to blue light as long as it can emit light whose wavelength is shorter than the emission wavelength of the phosphor. The present exemplary embodiment hereinbelow will be described on the assumption that first light source 11 emits blue light.

First collimator lenses 12 refract the blue light beams emitted from each of laser diodes of first light source 11 to collimated light.

First condenser lens 13 condenses the multiple beams of light that have been collimated by first collimator lenses 12.

First divergent lens 14 diverges the multiple light beams that have been converged by first condenser lens 13 back to collimated light.

First diffusing plate 15 diffuses the light beams collimated by first divergent lens 14 in uniform illumination distribution.

Figure 2:
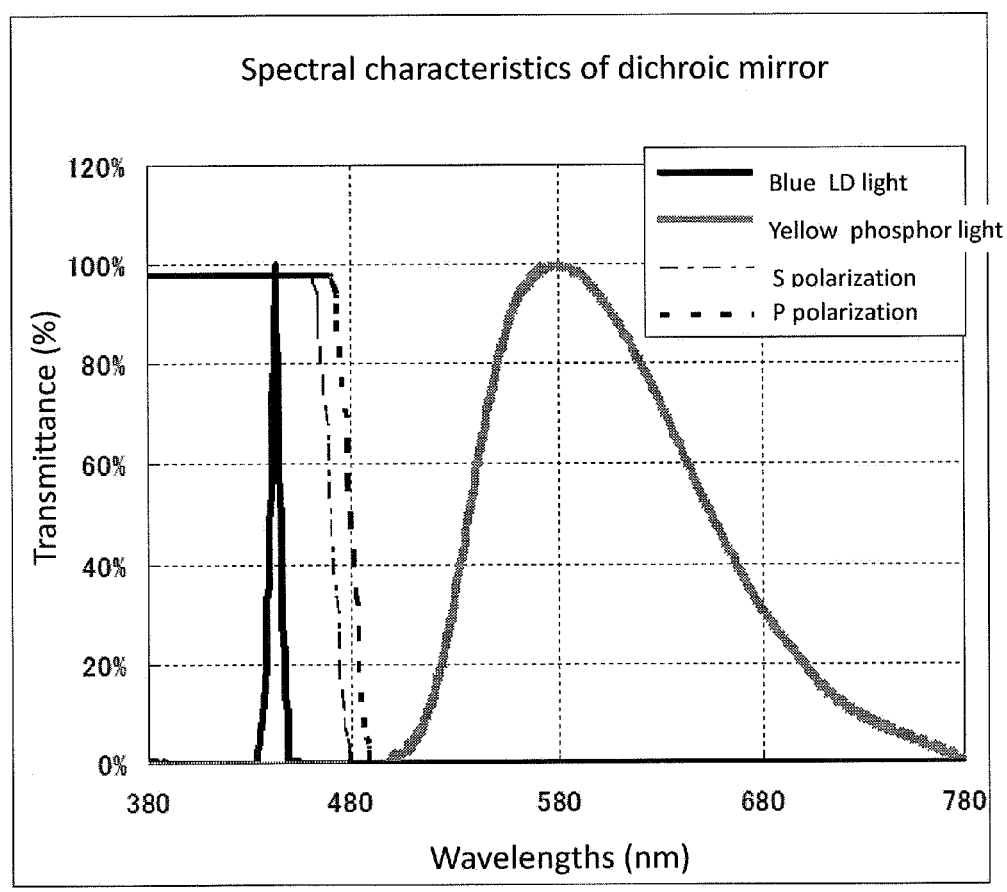
FIG. 2 A graph showing the spectral characteristics of a dichroic mirror of the projector shown in FIG. 1.

Dichroic mirror 16 reflects or transmits incident light by wavelengths to separate the incident light into components of light. FIG. 2 is a graph showing the spectral characteristics of dichroic mirror 16. As shown in FIG. 2, dichroic mirror 16 transmits blue light and reflects yellow light. The yellow light is light that contains red light and green light. In the present exemplary embodiment, dichroic mirror 16 reflects the yellow light that has been wavelength-converted from the blue light emitted by first light source 11 and transmits the blue light emitted from second light source 20. Here, dichroic mirror 16 is one example of a combiner that combines the yellow light incident from phosphor wheel 19 and the blue light incident from second light source 20 to deliver the combined light to color wheel 28.

Second condenser lens 17 condenses the blue light that passed through first diffusing plate 15 and dichroic mirror 16 and collimates the light incident from the phosphor wheel 19 side.

Third condenser lens 18 converges the blue light that passed through second condenser lens 17 on phosphor wheel 19 and refracts light incident from the phosphor wheel 19 side to be incident on second condenser lens 17.

Phosphor wheel 19 includes a disc with a phosphor applied thereon and a motor for turning the disc. Phosphor wheel 19 converts the wavelength of the blue light incident from the first light source 11 side and emits yellow light. As the disc turns, it is possible to prevent the incident blue light from burning the phosphor by irradiation with a local high light density. Here, first light source 11 and phosphor wheel 19 form one example of a first light source unit that emits combined light containing the first color light and the second color light.

Second light source 20 includes a plurality of laser diodes and emits blue light.

Second collimator lenses 21 refract the blue light emitted from each of laser diodes of second light source 20 to create collimated light.

Fourth condenser lens 22 converges the multiple beams of light that have been collimated by second collimator lenses 21.

Second divergent lens 23 diverges the multiple light beams that have been converged by fourth condenser lens 22 back to collimated light.

Second diffusing plate 24 diffuses the light beams collimated by second diffusing lens 23 in uniform illumination distribution.

Fifth condenser lens 25 converges the yellow light that has entered dichroic mirror 16 from the phosphor wheel side 19 and that has been reflected by dichroic mirror 16 and the blue light incident from the second light source 20 side.

First reflector 26 reflects light that passed through fifth condenser lens 25 to change the direction of travel of the light.

Sixth condenser lens 27 converges the light reflected by first reflector 26.

Color wheel 28 has a plurality of transmissive regions that each have different transmissible wavelengths, and receives light emitted from first light source 11 and second light source 20 as incident light. Further, color wheel 28 time-divides the incident light into multiple colors of light by rotating the disc portion including multiple transmissive regions about a predetermined rotary axis so that the point on which the incident light falls moves over the individual transmission regions.

Figure 3:
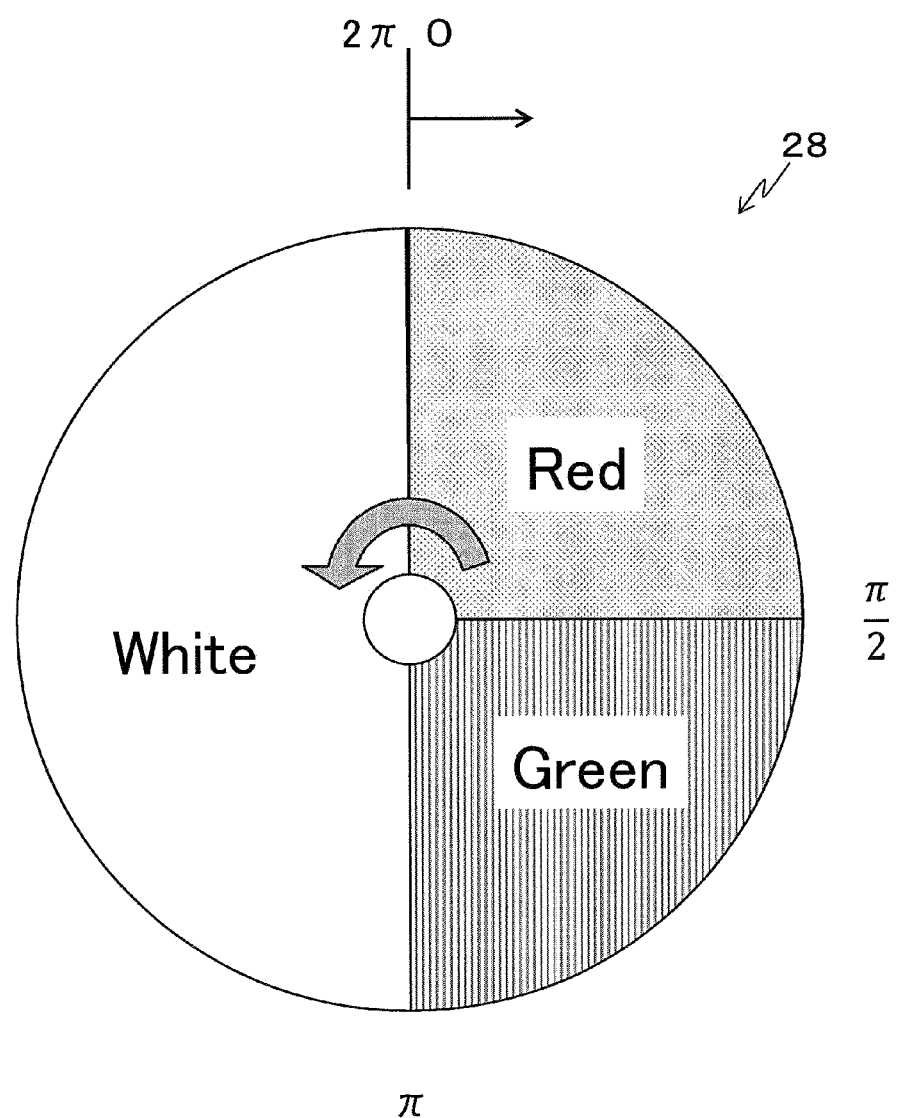
FIG. 3 A diagram showing a configuration of transmissive regions of a color wheel of the projector shown in FIG. 1.
Figure 4:
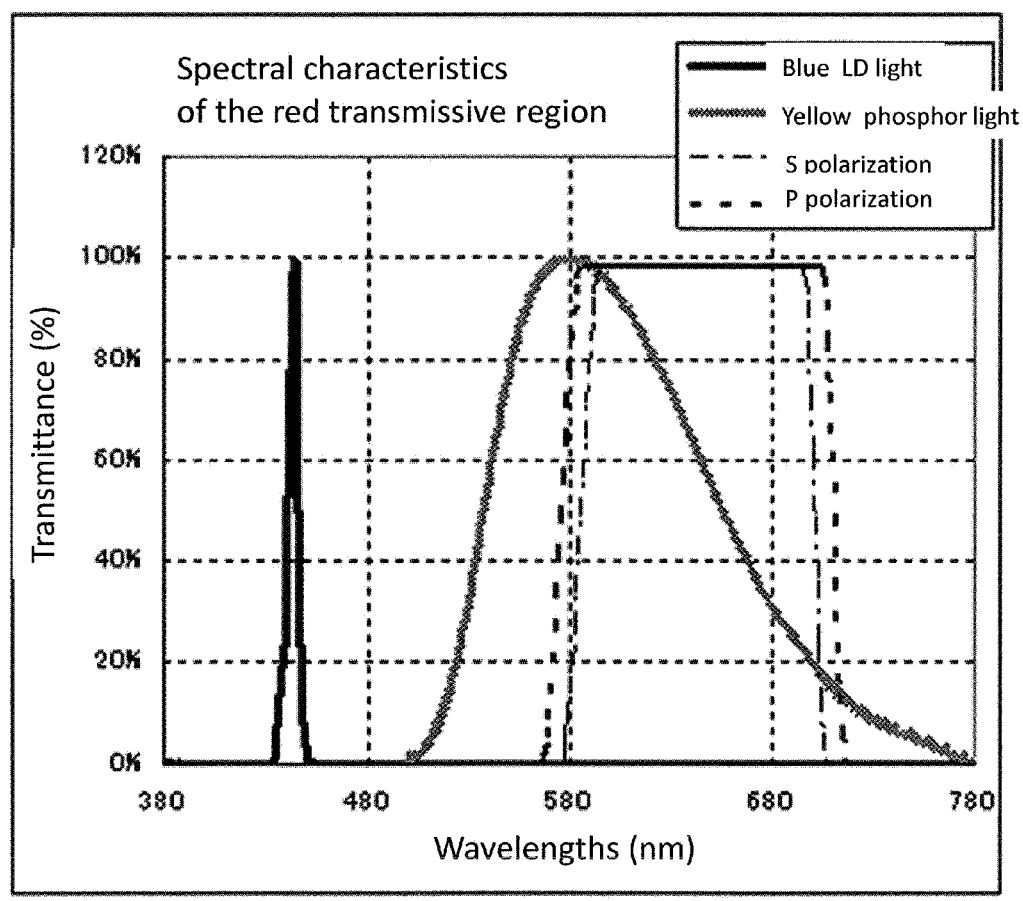
FIG. 4 A graph showing the spectral characteristics of a red transmissive region of the color wheel of the projector shown in FIG. 1.
Figure 5:
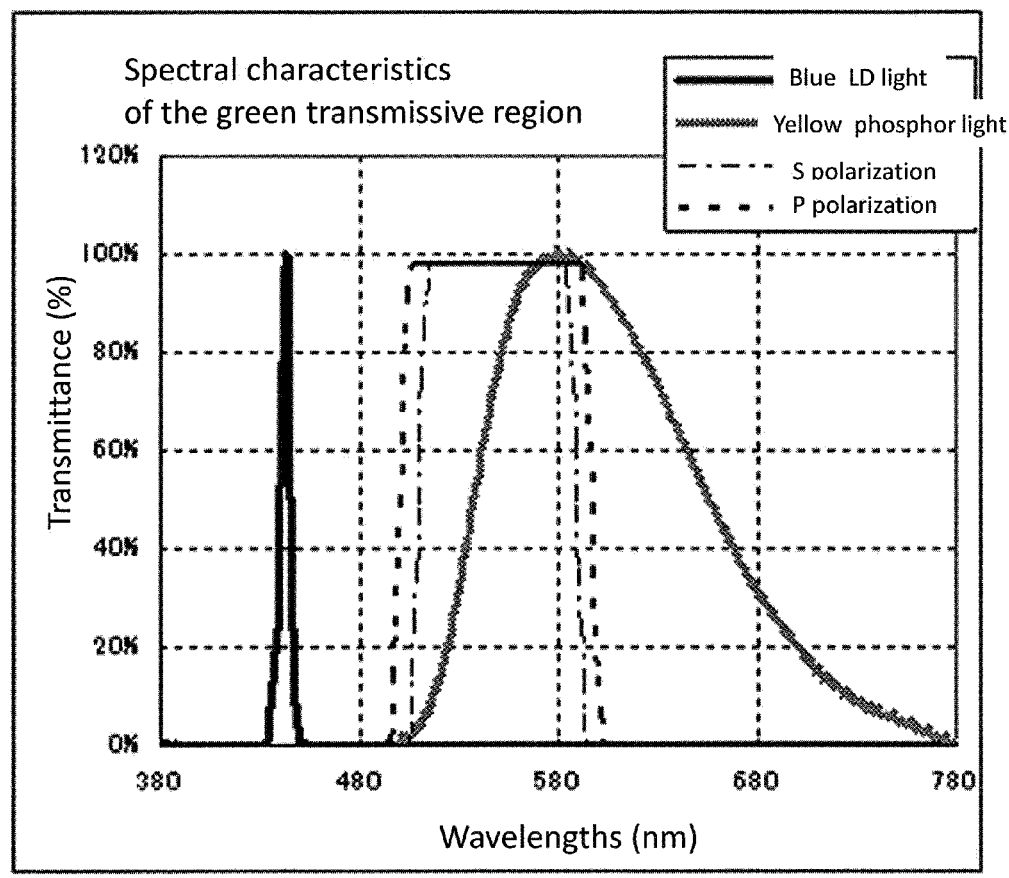
FIG. 5 A graph showing the spectral characteristics of a green transmissive region of the color wheel of the projector shown in FIG. 1.

FIG. 3 is an illustrative diagram showing a configuration of transmissive regions of the color wheel of the projector according to the present exemplary embodiment. In the disc of color wheel 28 shown in FIG. 3, a red light transmissive region for transmitting light in the wavelength range of red light occupies a quarter of the total area of the disc, a green light transmissive region for transmitting light in the wavelength range of green light occupies a quarter and a white light transmissive region for transmitting light in the whole wavelength range of light occupies a half. FIG. 4 is a graph showing the spectral characteristics of the red transmissive region of the color wheel of the projector according to this exemplary embodiment. As shown in FIG. 4, the red light transmissive region has characteristics that permit only the red component contained in yellow light to pass therethrough. FIG. 5 is a graph showing the spectral characteristics of the green transmissive region of the color wheel of the projector according to this exemplary embodiment. As shown in FIG. 5, the green light transmissive region has characteristics that permit only the green component contained in yellow light to pass therethrough. This color wheel 28 is constructed so that the disc portion rotates counter-clockwise.

Returning to explanation with FIG. 1. Light tunnel 29 receives the light that passed through color wheel 28 as incident light and has a plurality of reflecting facets on the interior wall so that the incident light is reflected a multiple number of times to emit as light that has uniform luminance distribution.

Seventh condenser lens 30 converges the light that emitted from light tunnel 29.

Second reflector 31 reflects the light that passed through seventh condenser lens 30 to change the direction of travel of the light.

Eighth condenser lens 32 converges the light reflected by second reflection light 31.

Third reflector 33 reflects the light that passed through eighth condenser lens 32 to change the direction of travel of the light.

Ninth condenser lens 34 converges the light reflected by third reflector 33. This ninth condenser lens 34 converges light on DMD 36.

Cover glass 35 protects the surface of DMD 36. Cover glass 35 transmits the light refracted by ninth condenser lens 34.

DMD 36 is a semiconductor projecting device having micro mirrors arrayed in a matrix fashion, and spatially modulates the incident light in accordance with the video signal to output the modulated light. Specifically, each mirror of DMD 36 corresponds to one pixel and sets its angle to incident light to the on state or to the off state in accordance with the video signal. The light reflected by the on-state mirror propagates towards projection optical system 37. On the other hand, light reflected by the off-state mirror propagates in a direction different from the direction of projection optical system 37. The on state and off state are switched at high speeds so that color tones can be reproduced by changing the temporal ratio between the on state and the off state.

Projection optical system 37 enlarges the light reflected by DMD 36 and projects it on the screen (not illustrated).

Storage 50 stores data used for operating projector 100. In the present exemplary embodiment, storage 50 stores multiple pieces of lighting pattern information that represent lighting patterns for turning on first light source 11 and second light source 12 for different periods of time in one revolution of color wheel 28. Herein, the lighting pattern information is a piece of information that determines which display mode, from among multiple display modes, is to be activated. For examples, lighting patterns, that lighting pattern information indicate, include a lighting pattern for turning on multiple light source units to produce white light by combining the light emitted from the light source units. Further, for examples, lighting patterns, that lighting pattern information indicate, include a lighting pattern corresponding to a high-color reproducibility mode in which blue light is radiated as incident light on the white light transmissive region and a lighting pattern corresponding to a high-luminance mode in which a plurality of color light are successively made incident on the white light transmissive region.

Controller 60 is electrically connected to first light source 11, second light source 20, color wheel 28, DMD 36 and others to control the operation of each of the connected components. For example, controller 60, based on one of the multiple lighting patterns of information stored in storage 50, turns on first light source 11 and second light source 20.

In this operation, controller 60 receives a select signal for selecting one pattern from among multiple lighting patterns and turns on light sources in accordance with the lighting pattern information that represents the lighting pattern selected by the select signal. Controller 60 also performs switching control to turn on and off every mirror in DMD 36 in accordance with the video signal.

In this configuration, the light path emitted from each light source propagates as follows. First, light emitted from first light source 11 is shaped into collimated light by first collimator lenses 12. The multiple light beams thus collimated are converged by first condenser lens 13 and shaped back to collimated light by first divergent lens 14. Here, use of first condenser lens 13 and first divergent lens 14 to reduce the spread of light beams emitted from multiple laser diodes makes it possible to downsize optical parts to be used in the downstream stages.

The collimated light after transmission through first divergent lens 14 passes through first diffusing plate 15 and dichroic mirror 16 and is converged on phosphor wheel 19 by passing through second condenser lens 17 and third condenser lens 18. The light converged on phosphor wheel 19 is wavelength-converted by the phosphor into yellow light having a wavelength distribution range of about 485 nm to 780 nm. This yellow light behaves as divergent light close to perfect diffused light.

This yellow light is transmitted through third condenser lens 18 and second condenser lens 17, and enters dichroic mirror 16 as a pseudo-collimated light. The yellow light is reflected by dichroic mirror 16 and is converged near the entrance opening of light tunnel 29 by fifth condenser lens 25 and sixth condenser lens 27 to be led to light tunnel 29. At this time, the light is reflected by first reflector 26 between fifth condenser lens 25 and sixth condenser lens 27. This first reflector 26 is provided to deflect the optical path so that the size of projector 100 can be made compact.

The light that entered light tunnel 29 is repeatedly reflected by reflectors on the interior surface of light tunnel 29 so that the light on the outgoing plane of light tunnel 29 has an approximately uniform square luminance distribution. The light propagates through a relay optical system formed of seventh condenser lens 30, eighth condenser lens 32 and ninth condenser lens 34 while maintaining the luminance distribution at the outgoing plane of light tunnel 29 and is enlarged in its illuminating area to illuminate DMD 36. Similarly to first reflector 26, second reflector 31 disposed between seventh condenser lens 30 and eight condenser lens 32 as well as third reflector 33 disposed between eighth condenser lens 32 and ninth condenser lens 34 is also provided to deflect the optical path so that the size of projector 100 can be made compact and to determine the incident angle of light on DMD 36.

The light incident on DMD 36 is spatially modulated based on the video signal. The light reflected by the on-state mirrors from among all the mirrors of DMD 36 enters projection optical system 37. Projection optical system 37 enlarges the image of incident light and projects the image on the screen.

On the other hand, the light emitted from second light source 20 is shaped into collimated light by second collimator lenses 21. The thus collimated multiple light beams are converged by fourth condenser lens 22 and are again shaped into collimated light by second divergent lens 23.

The collimated light after passage of second divergent lens 23 is transmitted through second diffusing plate 24 to be incident on dichroic mirror 16. The light that enters dichroic mirror 16 is transmitted through dichroic mirror 16 and propagates in the same light path as the light reflected by phosphor wheel 19. Since the light path, after light has passed through dichroic mirror 16, is the same as the reflected light from phosphor wheel 19, description is omitted herein.

Next, color sequences of transmitted light that passed through color wheel 28 when first light source 11 and second light source 20 are switched on and off in accordance with the examples of lighting pattern information, will be described using multiple examples of lighting pattern information. FIGS. 6 to 9 are illustrative diagrams each showing an example of a lighting pattern, a color sequence of incident light on the color wheel, a configuration of transmissive regions in the color wheel and a color sequence of transmitted light that passed through the color wheel. The configurations of transmissive regions in FIGS. 6 to 9 are the same as that shown in FIG. 3.

Herein, T represents the time required for color wheel 28 to make one revolution. Although in FIGS. 6 to 9 the color sequence of light that passed through color wheel 28 during the period of $0 \leq t \leq T$ is shown, in actual practice, for time after T (t>T) the on- and off-operation of lighting of each light source is repeated in the same manner as in the period of $0 \leq t \leq T$.

Figure 6:
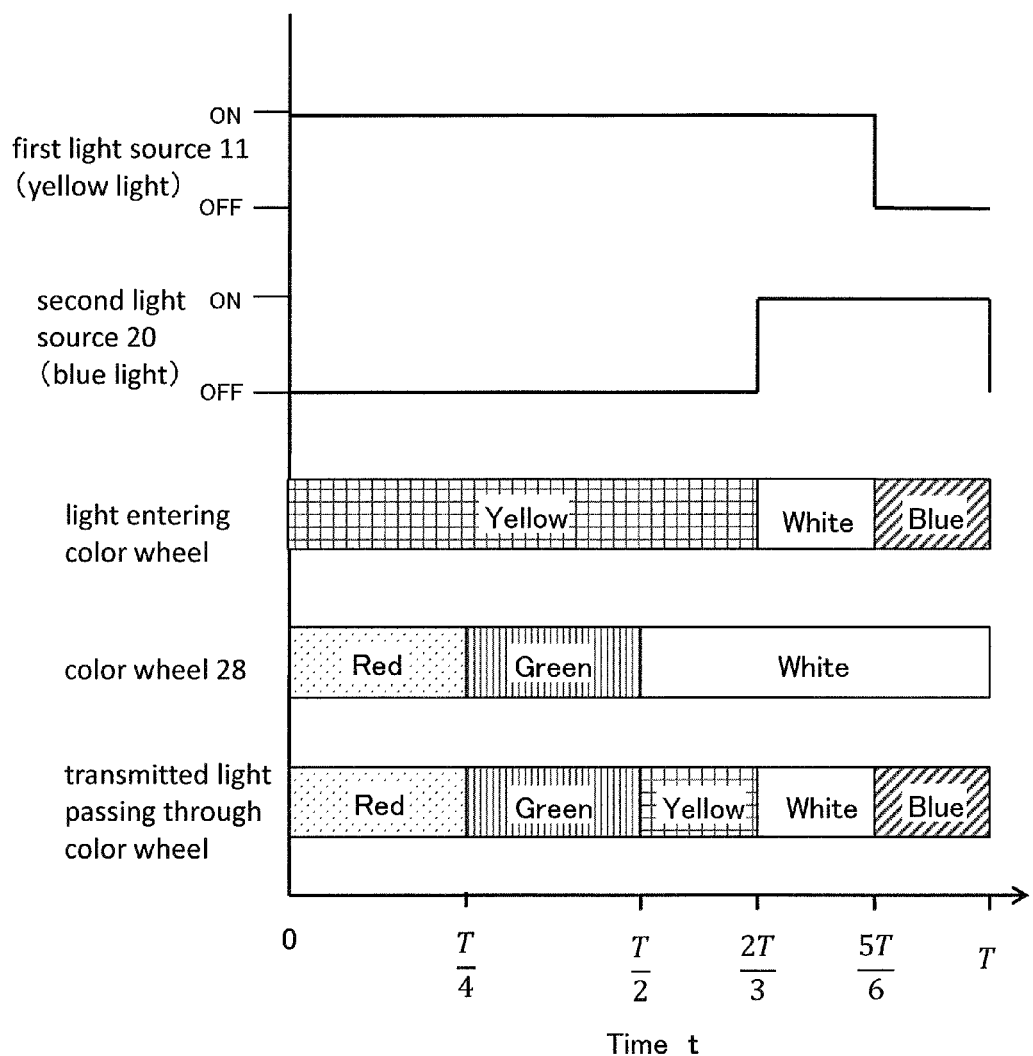
FIG. 6 A diagram showing an example of a color sequence of transmitted light having passed through a color wheel with a lighting pattern information that the projector shown in FIG. 1 uses.

For example, FIG. 6 shows an example when controller 60 turns on each light source unit in accordance with the first lighting pattern information.

In FIG. 6, controller 60 turns on first light source 11 in the period of $0 < t < 5T/6$ and turns on second light source 20 in the period of $2T/3 < t < T$.

In the period during which both light source units are turned on at the same time, the incident light entering color wheel 28 is a mixture of multiple colors of light from the light source units. Accordingly, in this case, as the incident light on color wheel 28, yellow light enters in the period of $0 < t < 2T/3$, yellow light and blue light are mixed thus producing white light in the period of $2T/3 < t < 5T/6$ and blue light enters in the period of $5T/6 < t < T$.

Accordingly, yellow light enters the red light transmissive region of color wheel 28, and the green light component of the incident yellow light is blocked by the red light transmissive region so that only the red light component is transmitted through the red light transmissive region. Yellow light also enters the green light transmissive region of color wheel 28, and the red light component of the yellow light is blocked by the green light transmissive region so that only the green light component is transmitted through the green light transmissive region. Then, yellow light, white light and blue light sequentially enter the white light transmissive region, and yellow light, white light and blue light pass through the white light transmissive region, successively.

As a result, the transmitted light that passes through color wheel 28 changes in the order of red, green, yellow, white and blue.

Figure 7:
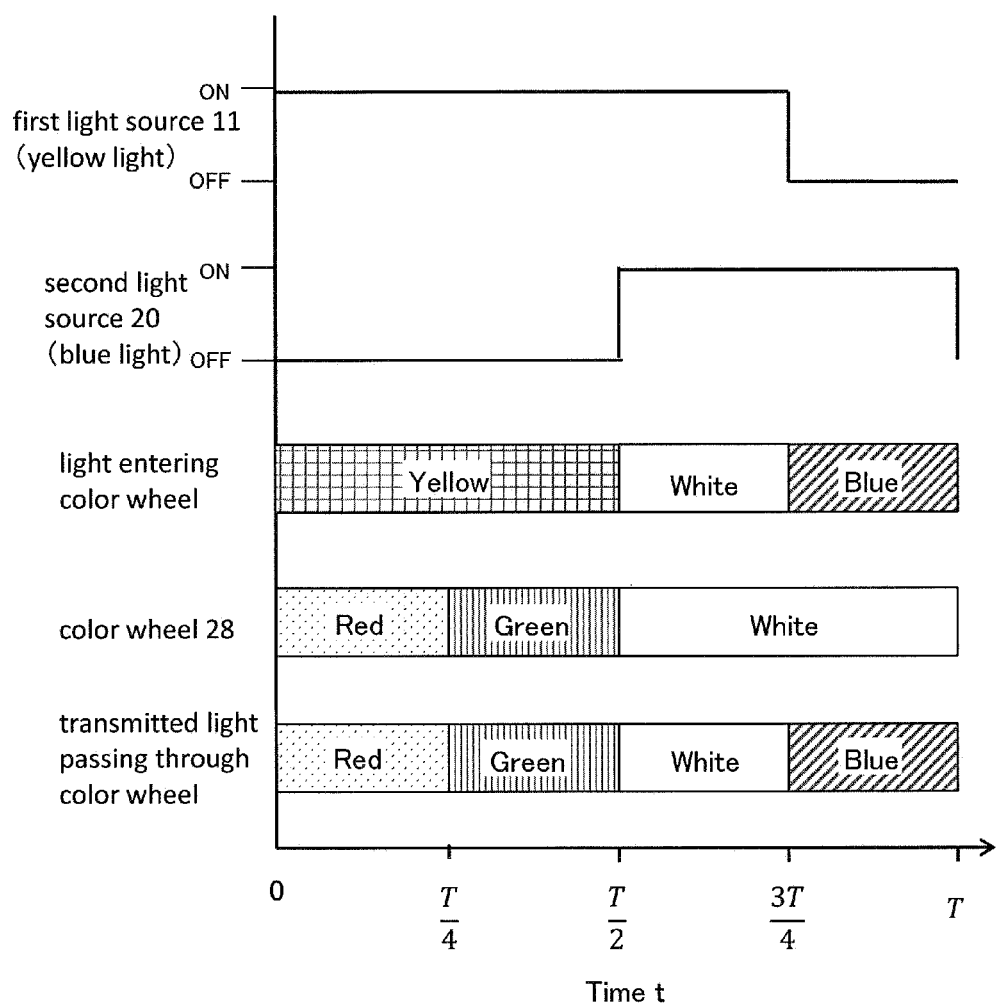
FIG. 7 A diagram showing another example of a color sequence of transmitted light having passed through a color wheel with a lighting pattern information that the projector shown in FIG. 1 uses.

FIG. 7 shows an example when controller 60 turns on each light source unit in accordance with the second lighting pattern information.

In FIG. 7, controller 60 turns on first light source 11 in the period of $0 < t < 3T/4$ and turns on second light source 20 in the period of $T/2 < t < T$.

As a result, as incident light on color wheel 28, yellow light enters in the period of $0 < t < T/2$, white light enters in the period of $T/2 < t < 3T/4$ and blue light enters in the period of $3T/4 < t < T$.

Accordingly, yellow light enters the red light transmissive region of color wheel 28, and the green light component of the yellow light is blocked by the red light transmissive region so that only the red light component is transmitted through the red light transmissive region. Yellow light also enters green light transmissive region of color wheel 28, and the red light component of the yellow light is blocked by the green light transmissive region so that only the green light component is transmitted through the green light transmissive region. Then, white light and blue light sequentially enter the white light transmissive region. At this time, white light and blue light pass through the white light transmissive region, successively.

As a result, the transmitted light that passes through color wheel 28 changes in the order of red, green, white and blue.

Figure 8:
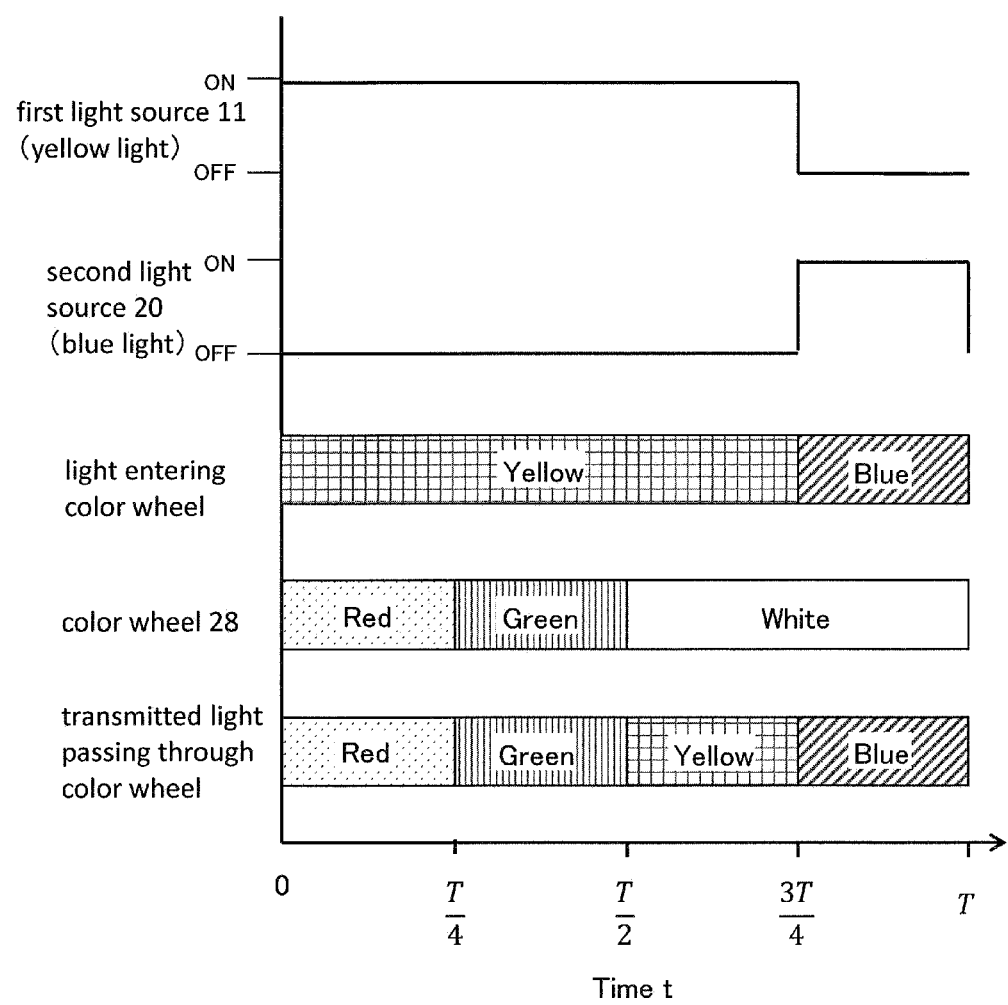
FIG. 8 A diagram showing a further example of a color sequence of transmitted light having passed through a color wheel with a lighting pattern information that the projector shown in FIG. 1 uses.

FIG. 8 shows an example when controller 60 turns on each light source unit in accordance with the third lighting pattern information.

In FIG. 8, controller 60 turns on first light source 11 in the period of 0<t<3T/4 and turns on second light source 20 in the period of 3T/4<t<T.

As a result, as incident light on color wheel 28, yellow light enters in the period of 0<t<3T/4 and blue light enters in the period of 3T/4<t<T.

Accordingly, yellow light enters the red light transmissive region of color wheel 28, and the green light component of the yellow light is blocked by the red light transmissive region so that only the red light component is transmitted through the red light transmissive region. Yellow light also enters green light transmissive region of color wheel 28, and the red light component of the yellow light is blocked by the green light transmissive region so that only the green light component is transmitted through the green light transmissive region. Then, yellow light and blue light sequentially enter the white light transmissive region. At this time, yellow light and blue light pass through the white light transmissive region, successively.

As a result, the transmitted light that passes through color wheel 28 changes in the order of red, green, yellow and blue.

Figure 9:
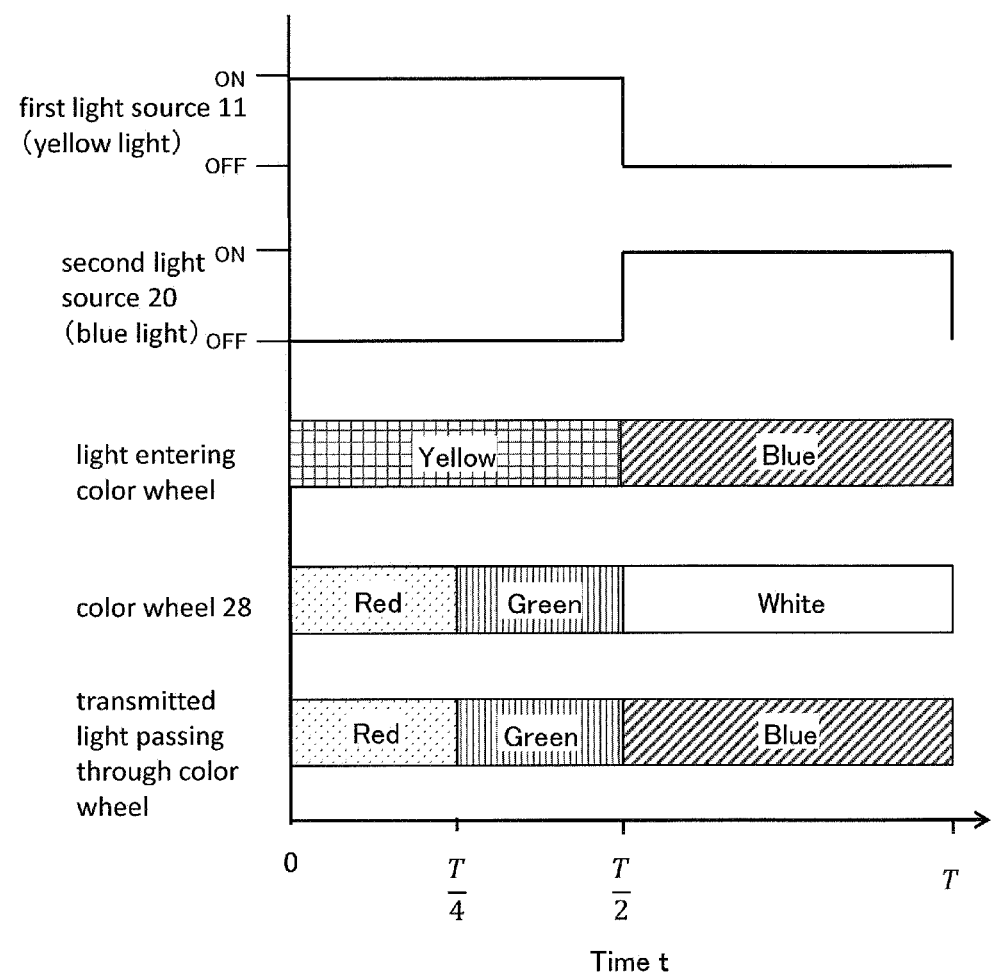
FIG. 9 A diagram showing still another example of a color sequence of transmitted light having passed through a color wheel with a lighting pattern information that the projector shown in FIG. 1 uses.

FIG. 9 shows an example when controller 60 turns on each light source unit in accordance with the fourth lighting pattern information.

In FIG. 9, controller 60 turns on first light source 11 in the period of 0<t<T/2 and turns on second light source 20 in the period of T/2<t<T.

As a result, as incident light on color wheel 28, yellow light enters in the period of 0<t<T/2 and blue light enters in the period of T/2<t<T.

Accordingly, yellow light enters the red light transmissive region of color wheel 28, and the green light component of the yellow light is blocked by the red light transmissive region so that only the red light component is transmitted through the red light transmissive region. Yellow light also enters green light transmissive region of color wheel 28, and the red light component of the yellow light is blocked by the green light transmissive region so that only the green light component is transmitted through the green light transmissive region. Then, blue light enters the white light transmissive region. At this time, blue light passes through the white light transmissive region.

As a result, the transmitted light that passes through color wheel 28 changes in the order of red, green and blue.

Use of multiple lighting patterns of information exemplified above enables projector 100 to produce different combinations of colors of transmitted light that passes through color wheel 28, namely, five colors (RGYWB), four colors (RGYB, RGWB) and three colors (RGB).

In a case of five or four colors of transmitted light, the ratio of light that is transmitted through color wheel 28 to the incident light while color wheel 28 makes one revolution, is higher than in the case of three colors. It is therefore possible to enhance the luminance of the projected image. On the other hand, in the case of three colors of transmitted light, the light intensities of colored light increase, so that it is possible to improve color reproducibility. Accordingly, the lighting patterns that produce five or four colors of transmitted light may be made to correspond to the high luminance mode, and the lighting pattern that produces three colors of transmitted light may be made to correspond to the high-color reproducibility mode.

As has been described, according to the present exemplary embodiment, since each light source unit is turned on in accordance with a selected lighting pattern, the period of turning on each light source unit during the period in which color wheel 28 makes one revolution is changed in accordance with the lighting pattern. Accordingly, the color sequence of incident light on color wheel 28 becomes different for every lighting pattern. As a result, the color sequence of transmitted light that passed through color wheel 28 changes. Accordingly, color reproducibility and luminance change in accordance with the color sequence of the transmitted light that passes through color wheel 28, so that it is possible to improve color reproducibility without reducing the maximum luminance by setting up an appropriate lightning pattern. In this way, it is possible to reduce lowering of luminance in a display mode that a display mode where color reproducibility is important.

Further, according to the present exemplary embodiment, light emitted from multiple light source units is combined at dichroic mirror 16 and then the combined light is made incident on color wheel 28. Color wheel 28 includes a white transmissive region for transmitting light in the entire range of incident light wavelengths, and the multiple lighting patterns include a lighting pattern that makes the combined light from dichroic mirror 16 become white light. As a result, it is possible to have a period of time in which all colors of white light pass through the color wheel, and thus display an image of high luminance.

Further, according to the present exemplary embodiment, combined light of the first color light and the second color light, and the third color light are emitted from the light source units while color wheel 28 includes the first transmissive region that transmits the first color light, the second transmissive region that transmits the second color light and the white light transmissive region that transmits light in the entire range of incident light wavelengths. As a result, the first transmissive region of color wheel 28 is able to transmit the first color light and the second transmissive region can transmit the second color light. Further, by changing the color of the incident light that enters the white transmissive region in various ways, it is possible to change the color sequence of transmitted light that passes through color wheel 28 in various patterns.

Further, according to the present exemplary embodiment, blue light emitted from first light source 11 enters phosphor wheel 19 and excites the phosphor wheel 19 to emit yellow light that contains red light and green light. Second light source 20 emits blue light.

According to the present exemplary embodiment, controller 60 turns on each of the light source units in accordance with one of multiple lighting patterns including a lighting pattern for a high-color reproducibility mode in which three colors of transmitted light are emitted from color wheel 28 and a high luminance mode in which four or five colors of transmitted light are emitted from color wheel 28. As a result, the user can display appropriate images that conform to depending upon circumstances.

Although the present invention has been explained with reference to the exemplary embodiment, the present invention should not be limited to the above exemplary embodiment. Various modifications that can be understood by those skilled in the art may be made to the structures and details of the present invention within the scope of the present invention.

For example, the above exemplary embodiment uses two kinds of light sources. However, the present invention should not be limited by this example. For example, three or more kinds of light sources may be used. Further, it is assumed in the above exemplary embodiment that each light source unit is formed of a plurality of laser diodes. However, the light source unit may be formed of a single laser diode if the necessary intensity of light can be obtained. Each light source unit may use light emitting diodes (LED; Light Emitting Diode) instead of laser diodes.

Although in the above exemplary embodiment the period of the turn-on interval of each light source unit during the period in which the color wheel makes one revolution is made different to change display modes, it is further possible to change the display mode in a more detailed manner by adjusting the light intensity of each light source.

Although a plurality of lighting patterns have been exemplified in the above exemplary embodiment, the lighting pattern should not be limited to those illustrated. Various modifications may be added. For example, the order in which colors of the incident light that enter color wheel 28 changes is a mere example, it is possible to change the order of colors of incident light by turning on the light source units in different orders.

The configuration of the transmissive regions of the color wheel illustrated in the above embodiment is a mere example. The configuration of transmissive regions may be modified as to allocation of transmissive regions and in size from the illustrated configuration depicted.

The projector according to the above exemplary embodiment may be a projector for front projection which projects images from the front side (the side from which the user views the images) of the screen, or may be a projector for rear projection which projects images from the back side of the screen (the opposite side from the side on which the user views the images).

DESCRIPTION OF REFERENCE NUMERALS

100 projector (illuminating optical device)
11 first light source
16 dichroic mirror
19 phosphor wheel
20 second light source
25 fifth condenser lens (combiner)
28 color wheel
36 DMD (reflection type image display device)
37 projection optical system

The invention claimed is:

1. An illuminating optical device comprising:
a plurality of light source units that each emits a different color of light;
a color wheel that includes a plurality of transmissive regions that each transmit the different color of light and that moves a point on which incident light from each light source unit falls, over the transmissive regions as the wheel rotates;
a storage that stores a plurality of lighting pattern information items, each item indicating a lighting pattern to turn on each light source unit in a different period of lighting; and,
a controller that receives a select signal for selecting one of the multiple lighting patterns to turn on each light source unit in accordance with the lighting pattern information item indicating the lighting pattern selected by the select signal.

2. The illuminating optical device according to claim 1, further comprising a combiner that combines light emitted from the multiple light source units to deliver the combined light to the color wheel, wherein
the color wheel includes a white transmissive region for transmitting light in an entire range of incident light wavelengths as one of the transmissive regions; and,
the multiple lighting patterns include a lighting pattern that makes the combiner combine the light to produce white light.

3. The illuminating optical device according to claim 2, wherein
the combiner comprises a dichroic mirror.

4. The illuminating optical device according to claim 1, wherein
the multiple light source units include a first light source unit emitting combined light including first color light and second color light and a second light source unit emitting third color light; and,
the color wheel includes a first transmissive region that transmits the first color light, a second transmissive region that transmits the second color light and a white light transmissive region that transmits light in an entire range of incident light wavelengths, as the transmissive regions.

5. The illuminating optical device according to claim 4, wherein
the first light source unit includes: a blue light source emitting blue light; and a phosphor unit that is excited by the blue light emitted from the blue light source to emit the combined light containing red light as the first color light and green light as the second color light, and,
the second light source unit emits blue light as the third color light.

6. The illuminating optical device according to claim 4, wherein the multiple lighting patterns includes a lighting pattern for a high-color reproducibility mode to emit three colors of transmitted light from the color wheel and a lighting pattern for a high-luminance mode to emit four or five colors of transmitted light from the color wheel.

7. A projector comprising:
an illuminating optical device according to claim 1;
a reflection type image display device that modulates light output from the illuminating optical device in accordance with a video signal; and,
a projection optical system that projects light modulated by the reflection type image display device.

8. The illuminating optical device of claim 1, wherein the color wheel includes first, second and third transmissive regions,
the first transmissive region comprising half of a total area of the color wheel,
the second and third transmissive regions each comprising a quarter of the total area of the color wheel.

9. A control method of an illuminating optical device including: a plurality of light source units each emitting a different color of light; a color wheel receiving incident light from each light source unit, the color wheel including a plurality of transmissive regions that each transmit the different color of light and moving a point on which incident light from each light source unit falls, over the transmissive regions as the wheel rotates, comprising:

receiving a select signal for selecting one item of information from among a plurality of lighting pattern information items, each item indicating a lighting pattern to turn on each light source unit in a different period of lighting; and, turning on each light source unit in accordance with the lighting pattern information item indicating the lighting pattern selected by the select signal.

10. The illuminating optical device according to claim 1, further comprising:

a digital micromirror device (DMD) that is arrayed in a matrix, and spatially modulates the incident light in accordance with a video signal to output said modulated incident light.

11. The method according to claim 9, further comprising;

changing a period of the turning on each light source unit while said color wheel makes one revolution in accordance with a specific lighting pattern.

12. The method of claim 9, wherein the color wheel includes first, second, and third transmissive regions, the first transmissive region comprising half of a total area of the color wheel, the second and third transmissive regions each comprising a quarter of the total area of the color wheel.

\* \* \* \* \*